United States Patent
Roussey et al.

(10) Patent No.: US 8,820,279 B2
(45) Date of Patent: Sep. 2, 2014

(54) ENGINE INCLUDING OIL PRESSURE PASSAGE WITH AIR BLEED

(75) Inventors: Kevin L. Roussey, Ortonville, MI (US); Patrick J. Tow, Rochester Hills, MI (US); Robert L. Jacques, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 201 days.

(21) Appl. No.: 13/470,829

(22) Filed: May 14, 2012

(65) Prior Publication Data

US 2013/0298854 A1 Nov. 14, 2013

(51) Int. Cl.
*F01L 1/34* (2006.01)

(52) U.S. Cl.
USPC ..................... 123/90.15; 123/90.16

(58) Field of Classification Search
CPC ............ F02F 7/006; F02F 7/00; F01L 1/047; F01L 1/12; F01L 9/02; F01L 1/185; F01L 13/0036; F01M 9/10
USPC .......... 123/90.15, 90.27, 90.43, 90.16, 90.17, 123/90.31
See application file for complete search history.

(56) References Cited

U.S. PATENT DOCUMENTS

| | | | |
|---|---|---|---|
| 6,684,836 B2 * | 2/2004 | Inoue ......................... | 123/90.17 |
| 2003/0213449 A1 * | 11/2003 | Bloms et al. ............... | 123/90.15 |
| 2006/0112916 A1 * | 6/2006 | Yoshijima et al. ......... | 123/90.15 |

* cited by examiner

*Primary Examiner* — Zelalem Eshete
(74) *Attorney, Agent, or Firm* — Harness, Dickey & Pierce, P.L.C.

(57) ABSTRACT

An engine assembly includes an engine structure, an air bleed valve and a hydraulically actuated engine component. The engine structure defines a first oil supply passage. The air bleed valve is in communication with the first oil supply passage and purges air from pressurized oil within the first oil supply passage. The hydraulically actuated engine component is in communication with the oil supply passage.

7 Claims, 4 Drawing Sheets

ENGINE INCLUDING OIL PRESSURE PASSAGE WITH AIR BLEED

FIELD

The present disclosure relates to engine oil pressure control systems.

BACKGROUND

This section provides background information related to the present disclosure which is not necessarily prior art.

An engine may include a hydraulically actuated valve lift mechanism that varies valve opening based on pressurized oil provided to the valve lift mechanism. Air trapped within the pressurized oil may increase the response time required to switch between lift modes.

SUMMARY

A cylinder head cover assembly may include a cylinder head cover defining an oil supply passage and an air purge passage and an air bleed valve. The air bleed valve may be located within the oil supply passage and may include an air inlet in communication with the oil supply passage and an air outlet in communication with the air purge passage. The air bleed valve may purge air from pressurized oil within the oil supply passage.

In another arrangement, an engine assembly may include an engine structure, an air bleed valve and a hydraulically actuated engine component. The engine structure may define a first oil supply passage. The air bleed valve may be in communication with the first oil supply passage and may purge air from pressurized oil within the first oil supply passage. The hydraulically actuated engine component may be in communication with the oil supply passage.

In another arrangement, an engine assembly may include an engine block and a cylinder head coupled to the engine block and defining a cylinder bore. The cylinder head may define an intake port in communication with the cylinder bore and an intake valve located within the intake port. A multi-step valve lift mechanism may be supported on the cylinder head and engaged with the intake valve. A camshaft may be supported for rotation on the cylinder head and engaged with the multi-step valve lift mechanism. A cylinder head cover may be coupled to the cylinder head and may define a first oil supply passage. An air bleed valve may be in communication with the first oil supply passage and may purge air from pressurized oil within the first oil supply passage. An oil control valve may be in communication with the first oil supply passage and the multi-step valve lift mechanism and may selectively provide communication between the first oil passage and the multi-step valve lift mechanism to switch the multi-step valve lift mechanism between a first mode providing a first valve lift and a second mode providing a second valve lift different than the first valve lift.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. As used herein, the term "module" refers to an application specific integrated circuit (ASIC), an electronic circuit, and/or a processor (shared, dedicated, or group) and memory that execute one or more software or firmware programs.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
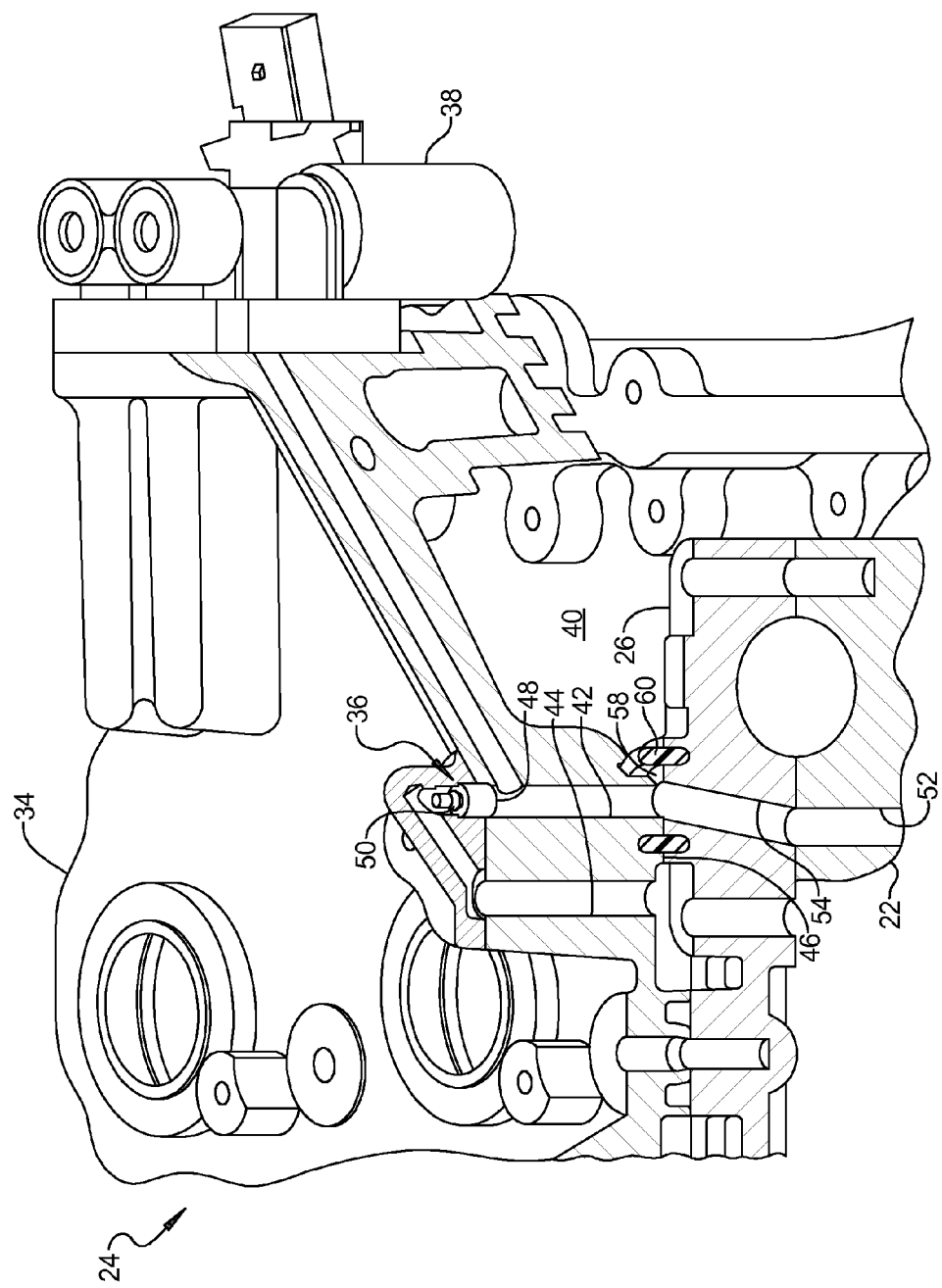
FIG. 1 is a fragmentary view of an engine assembly according to the present disclosure.
Figure 2:
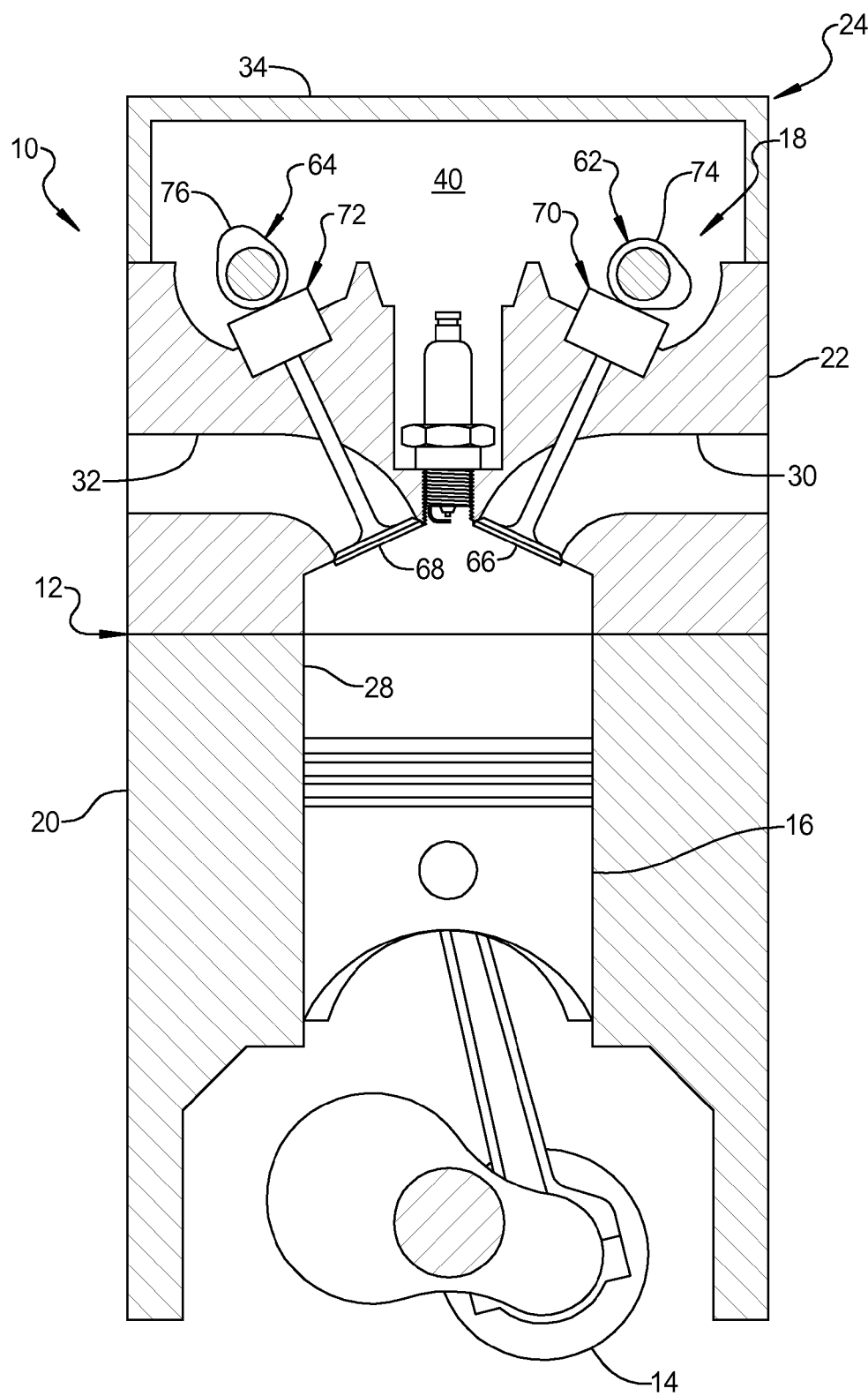
FIG. 2 is a schematic fragmentary section view of the engine assembly according to the present disclosure.

With reference to FIGS. 1 and 2, an engine assembly 10 may include an engine structure 12, a crankshaft 14, pistons 16 and a valvetrain assembly 18. The engine structure 12 may include an engine block 20, a cylinder head 22 coupled to the engine block 20, a cylinder head cover assembly 24 coupled to the engine block 20 and a cam bearing cap 26 coupled to the cylinder head 22. The engine block 20 may define cylinder bores 28. The cylinder head 22 cooperates with the engine block 20 to define combustion chambers. The cylinder head 22 may additionally define intake and exhaust ports 30, 32 in communication with the combustion chambers. It is understood that the present teachings apply to any number of piston-cylinder arrangements including, but not limited to, V-engines, inline engines, and horizontally opposed engines, as well as both overhead cam and cam-in-block configurations.

The cylinder head cover assembly 24 may include a cylinder head cover 34, an air bleed valve 36 and an oil control valve 38. The cylinder head cover 34 may be coupled to the cylinder head 22 and may define a cavity 40 between the cylinder head cover 34 and the cylinder head 22. The cylinder head cover 34 may define a first oil supply passage 42, an air purge passage 44 and a sealing surface 46 surrounding an inlet of the first oil supply passage 42. The air bleed valve 36 may be in the form of a pressure-actuated check valve and may be located in the first oil supply passage 42. The air bleed valve 36 may additionally include a screen (not shown) for air/oil separation.

The air bleed valve 36 may include an air inlet 48 in communication with the first oil supply passage 42 and an air outlet 50 in communication with the air purge passage 44. The air inlet 48 may face an interior region of the cylinder head cover 34. The air outlet 50 may face away from the interior region of the cylinder head cover 34. More specifically, when the cylinder head cover 34 is fixed to the cylinder head 22, the air inlet 48 may generally face a gravitational direction and the air outlet 50 may face a direction opposite the gravitational direction.

The oil control valve 38 may be coupled to the cylinder head cover 34 and may be in communication with the first oil supply passage 42. The cylinder head 22 may define a second oil supply passage 52 and the cam bearing cap 26 may define a third oil supply passage 54 in communication with the first oil supply passage 42 and the second oil supply passage 52. The cam bearing cap 26 may additionally define a sealing surface 58 surrounding the third oil supply passage 54 and abutting the sealing surface 46 of the cylinder head cover 34. The sealing surfaces 46, 58 may cooperate to define a groove housing a seal 60.

The valvetrain assembly 18 may include intake and exhaust camshafts 62, 64, intake valves 66 located in the intake ports 30, exhaust valves 68 located in the exhaust ports 32, intake valve lift mechanisms 70 and exhaust valve lift mechanisms 72. The intake and exhaust camshafts 62, 64 may be supported for rotation on the engine structure 12, and more specifically on the cylinder head 22. The intake camshaft 62 may include intake lobes 74 and the exhaust camshaft 64 may include exhaust lobes 76. The intake valve lift mechanisms 70 may be engaged with the intake lobes 74 and the intake valves 66 and the exhaust valve lift mechanisms 72 may be engaged with the exhaust lobes 76 and the exhaust valves 68.

Figure 3:
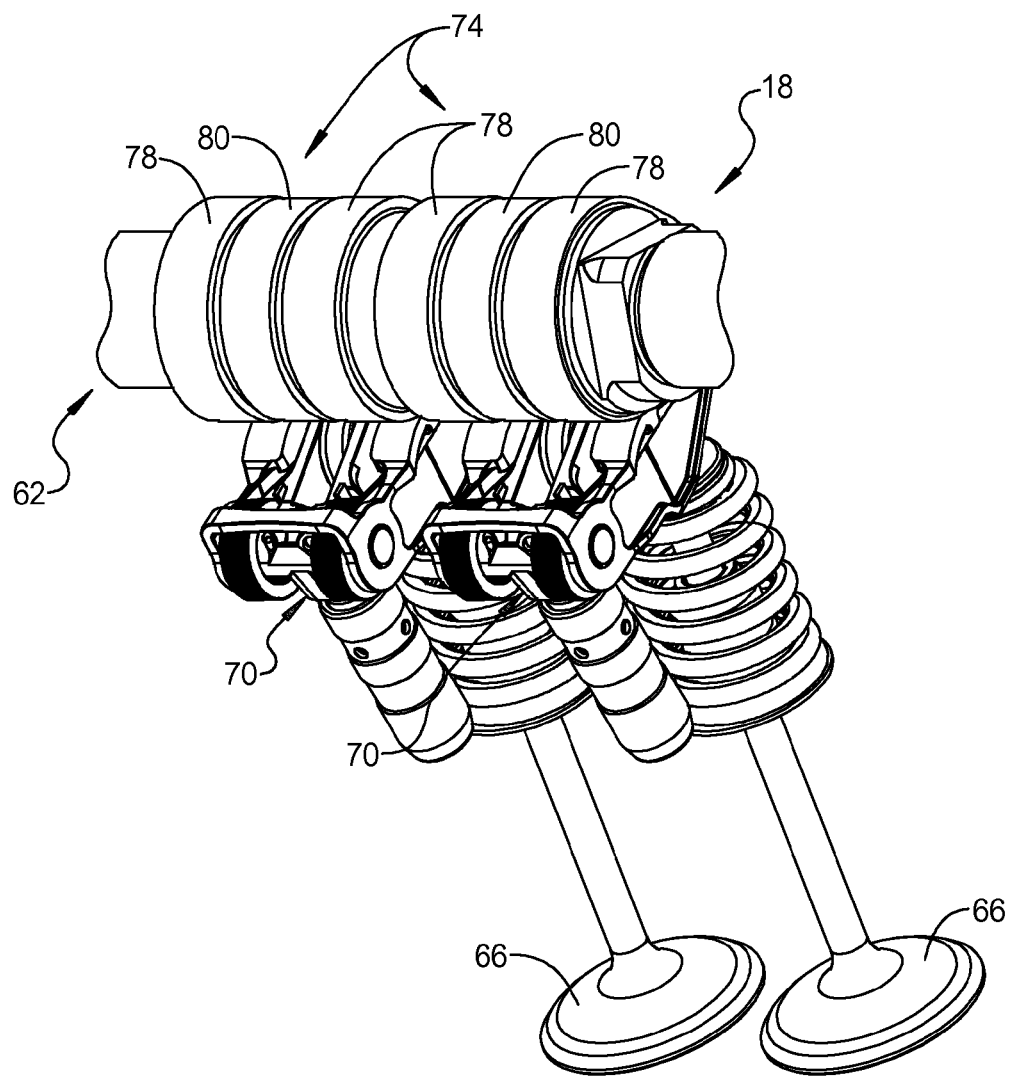
FIG. 3 is a perspective view of the valvetrain assembly included in the engine assembly of FIG. 2.
Figure 4:
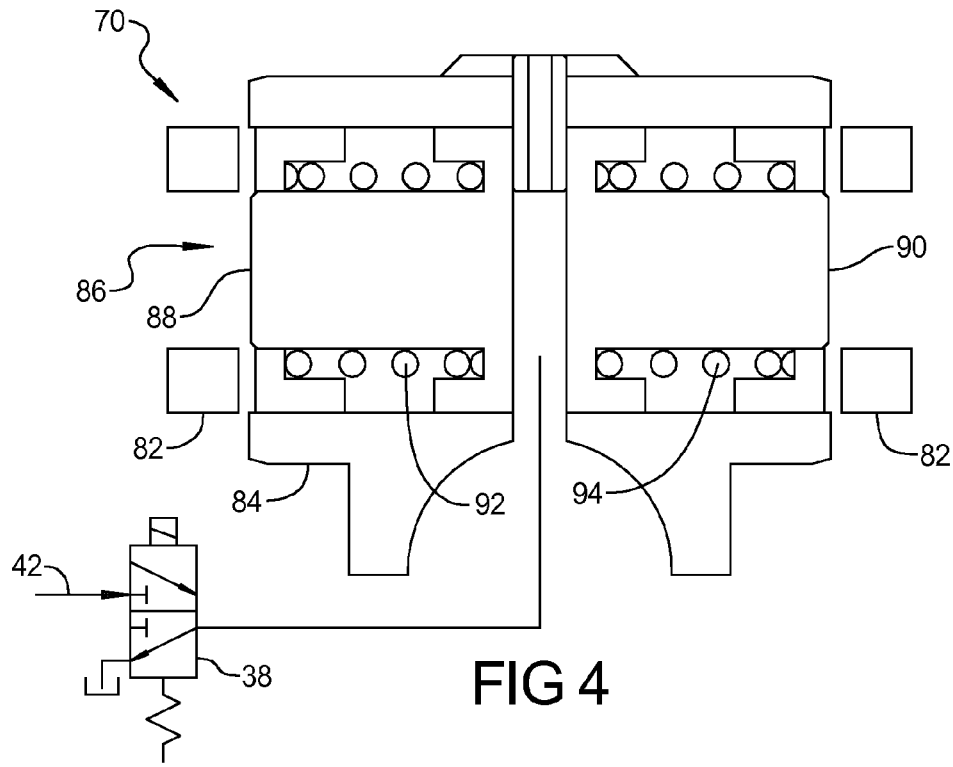
FIG. 4 is a schematic section view of a first intake valve lift mechanism from the valvetrain assembly shown in FIG. 3.
Figure 5:
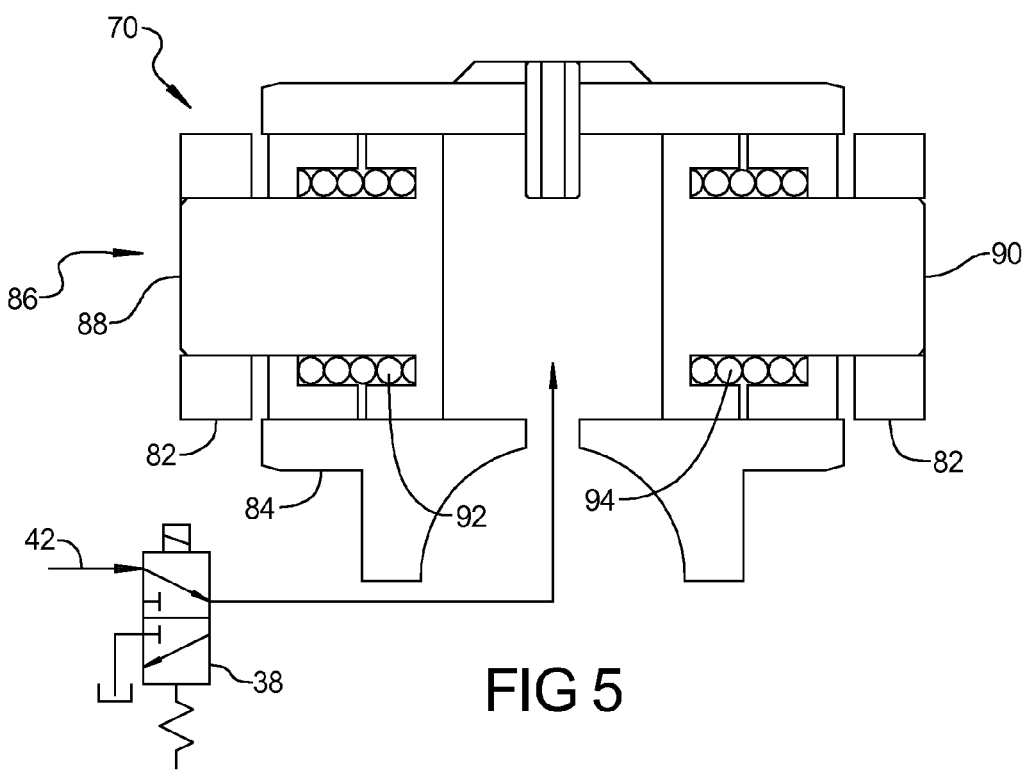
FIG. 5 is an additional schematic section view of the first intake valve lift mechanism shown in FIG. 4.

In the present non-limiting example, and as seen in FIGS. 3-5, the intake lobes 74 may include a pair of outer lobes 78 and an inner lobe 80 and the intake valve lift mechanisms 70 may form multi-step valve lift mechanisms. The intake valve lift mechanism 70 may be in the form of a rocker arm including first and second members 82, 84 and a locking mechanism 86. The outer lobes 78 may be engaged with the first member 82 and the inner lobe 80 may be engaged with the second member 84.

The intake valve lift mechanism 70 may form a hydraulically actuated engine component and may be operable in a first lift mode and a second lift mode. The locking mechanism 86 may secure the first and second members 82, 84 for displacement with one another during the first lift mode and may allow relative displacement between the first and second members 82, 84 during the second lift mode. The intake valve lift mechanism 70 may be in communication with pressurized oil from the first oil supply passage 42 via the oil control valve 38 to actuate the intake valve lift mechanism 70 between the first and second lift modes.

The locking mechanism 86 may include first and second lock pins 88, 90 and first and second biasing members 92, 94 housed within the second member 84. The locking mechanism 86 may be displaceable between an unlocked position (FIG. 4) and a locked position (FIG. 5). In the unlocked position, the first and second biasing members 92, 94 may force the first and second lock pins 88, 90 inward toward one another and out of engagement with the first member 82, allowing relative displacement between the first and second members 82, 84 during the first lift mode (FIG. 4). When operation in the second lift mode (FIG. 5) is desired, the oil control valve 38 may provide communication between the first oil supply passage 42 and the intake valve lift mechanism 70 to displace the locking mechanism 86 to the locked position. The pressurized oil may displace the first and second lock pins 88, 90 outward from one another against the force applied by the first and second biasing members 92, 94 and into engagement with the first member 82. While discussed as being normally biased to an unlocked condition, it is understood that the present disclosure applies equally to arrangements that are normally biased to a locked condition.

During operation, air within the pressurized oil may be purged by the air bleed valve 36 before being provided to the oil control valve 38, and ultimately to the intake valve lift mechanism 70. The reduced air content in the pressurized oil may improve response time for the transition between lift modes. While described in combination with a multi-step intake valve lift mechanism, it is understood that the present disclosure applies equally to exhaust valve lift mechanisms. It is further understood that the present disclosure may additionally apply to a variety of other hydraulically actuated engine components including, but not limited to, cam phasers, deactivating valve lift mechanisms, hydraulic lash adjusters and camshaft chain tensioners.

What is claimed is:

1. A cylinder head cover assembly comprising:
   a cylinder head cover defining an oil supply passage and an air purge passage; and
   an air bleed valve located within the oil supply passage and including an air inlet in communication with the oil supply passage and an air outlet in communication with the air purge passage in the cylinder head cover, the air bleed valve adapted to purge air from pressurized oil within the oil supply passage, wherein the air inlet of the air bleed valve faces an interior region of the cylinder head cover and the air outlet of the air bleed valve faces away from the interior region of the cylinder head cover; and
   an oil control valve coupled to the cylinder head cover and in communication with the oil supply passage, the oil control valve including an inlet in communication with the oil supply passage and an outlet adapted to selectively provide pressurized oil from the oil passage to a hydraulically actuated engine component.

2. The cylinder head cover assembly of claim 1, wherein the cylinder head cover defines a sealing surface surrounding an inlet of the oil supply passage in the cylinder head cover.

3. The cylinder head cover assembly of claim 2, wherein the sealing surface is adapted to abut a cam bearing cap and provide a sealed flow path between an additional oil passage in the cam bearing cap and the oil passage in the cylinder head cover.

4. An engine assembly comprising:
   an engine block defining a cylinder bore;
   a cylinder head coupled to the engine block and defining an intake port in communication with the cylinder bore;
   an intake valve located within the intake port;
   a multi-step valve lift mechanism supported on the cylinder head and engaged with the intake valve;
   a camshaft supported for rotation on the cylinder head and engaged with the multi-step valve lift mechanism;
   a cylinder head cover coupled to the cylinder head and defining a first oil supply passage;
   an air bleed valve in communication with the first oil supply passage and adapted to purge air from pressurized oil within the first oil supply passage; and
   an oil control valve in communication with the first oil supply passage and the multi-step valve lift mechanism and adapted to selectively provide communication between the first oil passage and the multi-step valve lift mechanism to switch the multi-step valve lift mechanism between a first mode providing a first valve lift and a second mode providing a second valve lift higher than the first valve lift.

5. The engine assembly of claim 4, further comprising a cam bearing cap coupled to the cylinder head and defining a second oil passage in communication with a pressurized oil supply and the first oil passage.

6. The engine assembly of claim 5, wherein the cylinder head cover defines a sealing surface surrounding an inlet of the oil passage in the cylinder head cover and abutting the cam bearing cap, providing a sealed flow path between the second oil passage in the cam bearing cap and the first oil passage in the cylinder head cover.

7. The engine assembly of claim 4, wherein the air bleed valve includes an air outlet facing generally opposite a gravitational direction and the cylinder head cover defines an air purge passage in communication with the air outlet and a cavity defined between the cylinder head cover and the cylinder head.

* * * * *